2,757,205

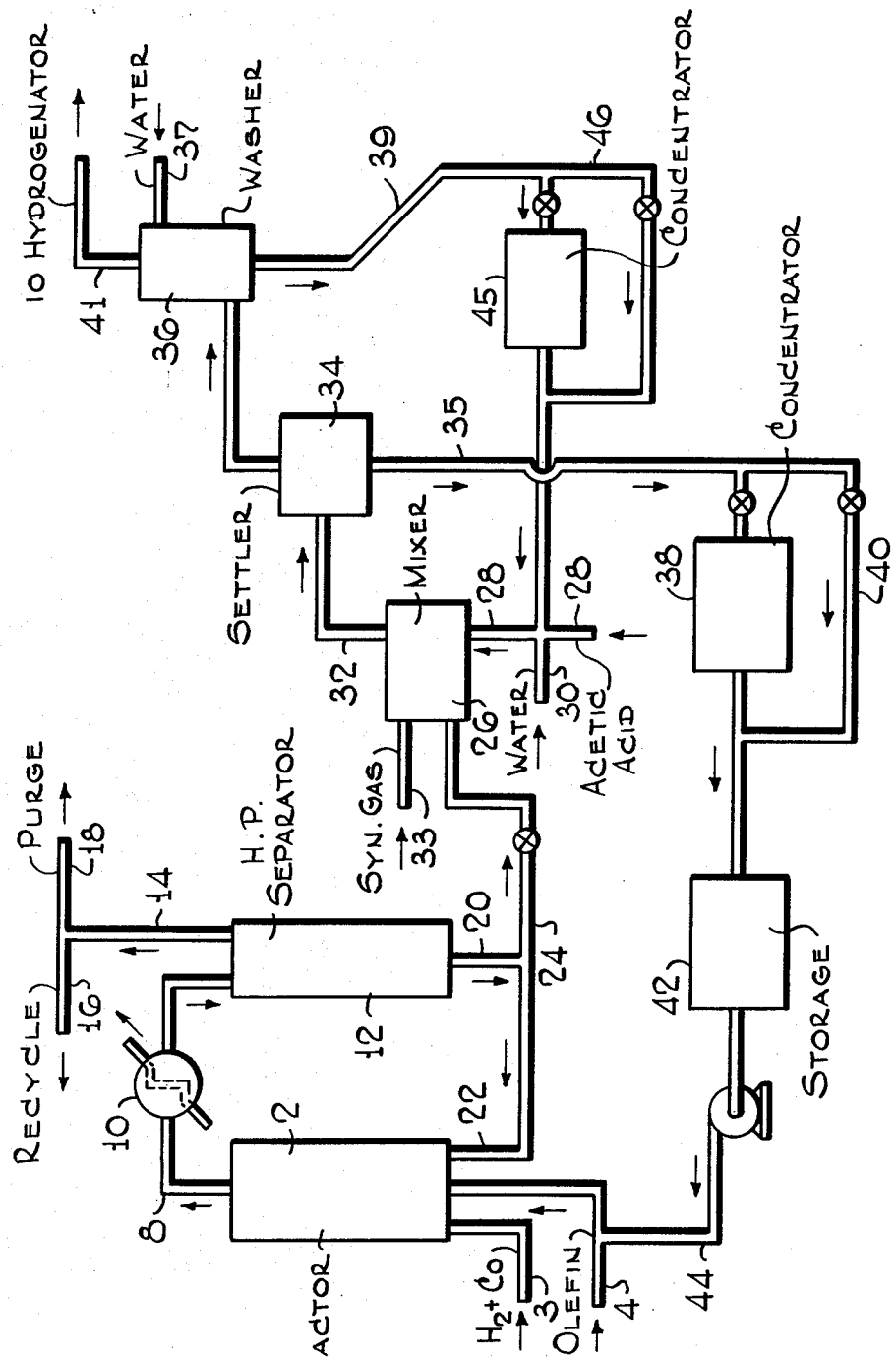

OXO PROCESS-ACID DECOBALTING IN PRESENCE OF CARBON MONOXIDE

Joseph K. Mertzweiller and Fred J. Buchmann, Baton Rouge, La., assignors to Esso Research and Engineering Company, a corporation of Delaware Application April 30, 1952, Serial No. 285,206

4 Claims. (Cl. 260—604)

The present invention relates to the preparation of organic compounds by the reaction of carbon monoxide and hydrogen with carbon compounds containing olefinic linkages in the presence of a carbonylation catalyst. More specifically, the present invention relates to the recovery of the cobalt catalyst utilized in the foregoing reaction from the product of the first stage of the cobalt carbonylation reaction for further use in the process.

It is now well known in the art that oxygenated organic compounds may be synthesized from organic compounds containing olefinic linkages by a reaction with carbon monoxide and hydrogen in the presence of a catalyst containing metal of the iron group, such as cobalt, in an essentially three-stage process. In the first stage, the olefinic material, catalyst and the proper proportions of CO and $H_2$ are reacted to give a product consisting predominantly of aldehydes containing one more carbon atom than the reacted olefin. This oxygenated organic mixture, which contains dissolved in it, salts and the carbonyls and molecular complexes of the metal catalyst, is treated in a second stage to cause removal of soluble metal compounds from the organic material in a catalyst removal zone. The catalyst-free material is then generally hydrogenated to the corresponding alcohols, or may be oxidized to the corresponding acid.

This carbonylation reaction provides a particularly attractive method for preparing valuable primary alcohols which find large markets, particularly as intermediates for plasticizers, detergents and solvents. Amenable to the reaction are long and short chained olefinic compounds, depending upon the type alcohols desired. Not only olefins, but most organic compounds possessing at least one non-aromatic carbon-carbon double bond may be reacted by this method. Thus, straight and branch-chained olefins and diolefins, such as, propylene, butylene, pentene, hexene, heptene, butadiene, pentadiene, styrene, olefin polymers, such as, di- and tri-isobutylene and hexene and heptene dimers, polypropylene, olefinic fractions from the hydrocarbon synthesis process, thermal or catalytic cracking operations, and other sources of hydrocarbon fractions containing olefins, may be used as starting material, depending upon the nature of the final product desired.

The catalyst in the first stage of the prior art processes is usually added in the form of salts of the catalytically active metal with high molecular fatty acids, such as, stearic, oleic, palmitic, naphthenic, etc., acids. Thus, suitable catalysts are, for example, cobalt oleate or naphthenate. These salts are soluble in the liquid olefin feed and may be supplied to the first stage as hydrocarbon solution or dissolved in the olefin feed.

The synthesis gas mixture fed to the first stage may consist of any ratio of $H_2$ to CO, but preferably these gases are present in about equal volumes. The conditions for reacting olefins with $H_2$ and CO vary somewhat in accordance with the nature of the olefin feed, but the reaction is generally conducted at pressures in the range of about 1500 to 4500 p. s. i. g., and at temperatures in the range of about 150–450° F. The ratio of synthesis gas to olefin feed may vary widely; in general, about 2500 to 15,000 cubic feet of $H_2+CO$ per barrel of olefin feed are employed.

At the end of the first stage, when the desired conversion of olefins to oxygenated compounds has been effected, the product and the unreacted material are generally withdrawn to a catalyst removal zone, where dissolved catalyst is removed from the mixture and it is to this stage that the present principal invention applies.

From the catalyst removal zone, the reaction products, comprising essentially aldehydes, may be transferred to a hydrogenation zone, and the products reduced to the corresponding alcohols in a manner known per se.

One of the problems involved in the aldehyde synthesis reaction is the fact that the catalyst metal, such as, cobalt, though added as an organic salt, reacts with carbon monoxide under the synthesis conditions to form the metal carbonyl. There is basis for the belief that the metal carbonyl itself is the active form of the catalyst. This dissolved catalyst must be removed prior to the subsequent hydrogenation, as otherwise, it would separate out on the hydrogenation catalyst, plug transfer lines and heat exchangers, etc. The carbonyl remains dissolved in the reaction product from the primary carbonylation stage and is, therefore, removed in the catalyst removal, or decobalting zone.

A way to remove the cobalt is by a thermal method, wherein the accrued product, comprising aldehydes containing substantial amounts of dissolved cobalt as carbonyl and also oil-soluble salts and complexes and compounds, is treated, preferably in the presence of a stripping gas, at temperatures of about 300–350° F. Heat may be supplied by a coil or other heat transfer surface immersed in the liquid. The purpose of the inert stripping gas, such as, hydrogen, is to decrease the CO partial pressure by removing CO as soon as formed by decomposition of the carbonyl, thus pushing the equilibrium reaction forward.

This process, however, has been far from satisfactory. Periodically, it has been necessary to take the decobalter off stream to remove accumulated metallic cobalt, to prevent plugging of feed lines and heat transfer surfaces, upon which cobalt metal deposits as a hard film. The removal of these films and deposited cobalt metal is a tedious and difficult process, and adds significant cost to the economics of the carbonylation reaction. Furthermore, thermal decobalting usually did not completely remove soluble cobalt from the aldehyde product, for though cobalt carbonyl was generally decomposed, other cobalt compounds present in the first stage aldehyde product, which may have arisen from secondary reactions in the oxo stage, such as, formic acid formation, were not decomposed under the thermal treating conditions.

These difficulties were to a great extent removed, and a long step forward taken when it was found that when the contaminated aldehyde product from the oxo stage, after degassing to remove unreacted and dissolved CO and $H_2$, was treated with dilute aqueous solutions of organic acids, whose cobalt salts are water-soluble and oil-insoluble, efficient decobalting was obtained with residual cobalt content of the aldehyde product less than 10 parts per million.

Thermal decobalting had frequently given a product with soluble cobalt content of 100–500 parts per million.

An important advantage of the acid decobalting operation, besides the fact that lower temperatures are required than in thermal decobalting, is that cobalt recovery is considerably simplified and made more feasible. Because of the strategic importance of this metal, it is essential for an economic operation that substantially all of the metal be recovered and reutilized. This is practically impossible in purely thermal processes for the metal and solid is precipitated on packing, reactor walls and heat transfer surfaces, and forms hard films, necessitating removal of the unit and drilling, etc., as well as cumbersome filtration operations. The effect of dilute aqueous organic acid injection, however, is to convert substantially all the cobalt dissolved in the aldehyde product, regardless in what form it is present, into a water-soluble salt, and this aqueous stream is readily separated from the decobalted aldehyde product.

The utilization of this aqueous cobalt stream, however, which may have a cobalt concentration of from 0.5 to 10%, poses several real problems. The most direct method of utilization would be recycling directly the aqueous stream to the primary aldehyde synthesis zone. This step, however, has the drawback that it involves recycling substantial quantities of water to the aldehyde synthesis reaction zone. Though relatively small amounts of water have been found useful in increasing selectivity to aldehydes, and also conversion of olefins, larger amounts have been found to cause reactor oven flooding and consequent stratification and quenching of the reaction. Flooding is particularly liable to occur if the cobalt solution recovered from the acid decobalter is relatively dilute. The limitation of concentration is given by the solubility of cobalt acetate in water, which is about 7.5% by weight (as cobalt).

Cobalt formate is considerably less soluble. Flooding of the reactor is liable to occur if it is attempted to recycle enough aqueous solution to provide adequate catalyst in the reactor oven corresponding to about 0.1–0.5% cobalt on olefin.

It is, therefore, an object of the invention, to provide an improved means for removing and recovering cobalt catalyst from conversion products resulting from the reaction of olefins, CO, and $H_2$, and efficiently reutilizing the recovered catalyst.

It is also a purpose of the invention to set forth a novel process for recovering extremely active forms of cobalt catalyst from the acid decobalting stage in an aqueous solution, and recycling this active catalyst to the primary reactor without introducing excessive amounts of water therein.

Other and further objects and advantages of the present invention will become apparent from the more detailed description hereinafter.

The surprising fact has now been found that when dilute aqueous acid decobalting is carried out under partial pressure of $H_2$ and CO of about 10–100 p. s. i., and higher, the acid treatment does not convert, even at the relatively high temperatures of 150–200° F., the cobalt carbonyl dissolved in the aldehyde product substantially into the corresponding acid salt, i. e. cobalt acetate if acetic acid is used to decobalt. Instead of the expected hydrolytic reaction under these circumstances, i. e., in the presence of CO and $H_2$, it has now been discovered that a substantial proportion of the cobalt in the water layer is present as the anion rather than as the cobaltous cation. Analysis of the recovered water layer has shown that 30–50% and more of the total cobalt is present as the anion $Co(CO)_4^-$, and the corresponding salt, $Co(Co(CO)_4)_2$.

By decobalting in accordance with the present invention, therefore, by injecting aqueous acid into the decobalter at elevated temperatures and under definite partial pressure of synthesis gas, one is enabled to obtain an aqueous solution of cobalt, which not only contains that element in a highly active catalyst form, i. e. as the $Co(CO_4)^-$ ion, which therefore does not require formation of that material in the initial reaction zone, but also, one is enabled to recover aqueous solutions of cobalt having a considerably higher concentration of that element than would be possible if cobalt were recovered as the low molecular weight organic acid salt, such as cobalt acetate or formate. Thus, though the solubility of cobalt acetate in water is about 7.5% (weight) as cobalt, in accordance with the present invention, aqueous solutions containing 9–10% cobalt, and even higher, have been obtained. The salt $Co(Co(CO)_4)_2$ has a cobalt content of 44% compared to 23% for cobalt acetate (tetrahydrate). This, therefore, provides an aqueous solution of higher cobalt content than has hitherto been available, for recycling to the reactor, and thus less water need be recycled, avoiding the flooding difficulties.

The unusual thermal and storage stability of the aqueous solution of the cobalt anion and cation is a matter of surprise. It may be stored indefinitely without special precaution, without decomposing significantly. In addition, this solution may be concentrated, with only slight decomposition, by distilling off water at atmospheric pressures, thus obtaining cobalt concentrations in water of any desired value. This step is not possible with cobalt acetate or formate, because of their limited water solubility.

Thus, by recycling this water layer, either with or without concentration, quite concentrated cobalt solutions, e. g. 8–10% is available in the aldehyde synthesis reactor thus minimizing the amount of water and the possibility of oven flooding. Also, the direct recycle of a considerable quantity of preformed catalyst contributes to a considerably more efficient operation, obviating the time lag in the reactor required for the preparation of active catalyst from the conventional cobalt feeds, such as, cobalt oleate, acetate, metal, and the like. This time lag, also referred to as an induction period, may be particularly pronounced with certain olefinic feed stocks derived from thermal or catalytic cracking operations, and is believed to result from the presence of inhibitors which interfere with the conversion of cobalt catalysts to cobalt carbonyl. Thus, it may be particularly desirable to introduce a considerable amount of the catalyst as the $Co(CO)_4^-$ ion.

The present invention will best be understood from the more detailed description hereinafter, wherein reference will be made to the accompanying drawing, which is a schematic representation of a system suitable for carrying out a preferred embodiment of the invention.

Turning now to the figure, olefin feed is passed after preheating in a fired coil (not shown) through feed line 4 to the bottom portion of primary reactor 2. The latter comprises a reaction vessel which may, if desired, be packed with non-catalytic material, such as Raschig rings, pumice, and the like, and may be divided into discrete packed zones.

Initially, catalyst may be injected as an oil-soluble cobalt soap, such as cobalt oleate or naphthenate, or the like, along with the olefin, in amounts equivalent to about 0.1–0.5% of cobalt on olefin. This oil-soluble catalyst is later cut back, as the recycle aqueous cobalt solution is added. Also, inasmuch as the aqueous cobalt solution is stable on storage, aqueous cobalt solution containing $Co(Co(CO)_4)_2$ from a previous operation may be employed.

A gas mixture comprising preferably approximately equal volume of $H_2$ and CO is supplied through line 3 to primary reactor 2 and flows concurrently with the olefin feed. Reactor 2 is preferably operated at a pressure of about 2500–3500 p. s. i. g. and at a temperature of about 200–450° F., depending upon the olefin feed and other reaction conditions.

Liquid oxygenated reaction product containing catalyst in solution and unreacted synthesis gas, is withdrawn overhead from an upper portion of reactor 2, and transferred through line 8 and cooler 10 to high pressure separator 12, which is maintained at pressures of about the same order of magnitude as reactor 2, and wherein a portion of the unreacted $H_2$ and CO are withdrawn overhead through line 14, and preferably, at least in part, recycled. A portion may be withdrawn through line 18, and employed in the mixer-decobalter to maintain the requisite CO—$H_2$ pressure in that zone.

A stream of primary reaction product containing dissolved therein relatively high concentration of cobalt carbonyl and other forms of cobalt is withdrawn from separator 12 through line 20. A portion of this stream may be recycled to reactor 2, via line 22 to aid in cooling and maintenance of temperature control of the primary carbonylation stage. The balance of the primary reaction product is now passed, without degassing or with only partial degassing, to the mixing zone 26.

This unit is of any conventional design and is adapted to mix thoroughly an aqueous and a water-insoluble liquid organic phase. Water is injected through line 30, and an organic acid of low molecular weight, such as, acetic, formic, and the like, is added through line 28. About 5 to 15% (based on aldehyde) of a 10% aqueous solution of acetic acid may be employed. Substantially less water is required than if the solubility limitations of cobalt acetate had to be met.

The temperature level within mixer 26, must be carefully controlled. High temperatures speed the reaction rate, but too high temperatures result in thermal decomposition of cobalt carbonyl to metallic cobalt, which is difficultly soluble in the dilute acid mixture, and this is undesirable. The temperature within mixing zone 26, is preferably maintained at about 150–185° F., and should not exceed about 200° F.

Within zone 26, there is maintained a carbon monoxide and hydrogen partial pressure of about 10 to 150 pounds per square inch gage, preferably 50 to 100 p. s. i. g. This is contrary to prior art processes, where purge gases have been employed to remove CO in order to hasten the decomposition of the dissolved cobalt carbonyl. In the present operation, however, it is desirable, and necessary, to maintain a definite CO partial pressure in order to obtain the high concentration aqueous cobalt solution already described. If necessary, additional $H_2$ and CO may be admitted through line 33; purge gas from 18 may be thus used.

After a sufficient period of mixing, about 30–120 minutes, the mixture is passed through line 32 to settler 34, where the aqueous and aldehyde layers are allowed to stratify. The upper aldehyde layer may then be passed to water washer 36, where hot water, at about 150–170° F., may be injected through line 37, to wash out the last traces of cobalt and acid. About 10% water may be used, and the wash water, withdrawn through line 39, may advantageously be concentrated in concentrator 45, and employed as the diluent for the organic acid used as the decobalting medium.

Overhead from 36, there is withdrawn through line 41, the substantially completely decobalted aldehyde product which may be passed to storage for subsequent conversion into alcohols in a manner known per se.

The lower aqueous layer, now containing in solution substantial quantities of $Co(Co(CO)_4)_2$, as well as some cobalt acetate is withdrawn from settler 34, through line 35. The solution may, if desired, be even further concentrated in unit 38, by a simple distillation and removal of water over head. This may be carried out even at atmospheric pressures without significant decomposition of the cobalt material. If desired, concentration may be carried out at diminished pressures, or omitted entirely. If the latter, concentrator 38, is avoided by by-pass line 40. The aqueous solution containing 5 to 10% by weight of cobalt, is passed to storage chamber 42, and is pumped as needed through line 44 into the aldehyde synthesis reactor 2.

The invention admits of numerous modifications apparent to those skilled in the art.

The invention may be further illustrated by the following specific examples of laboratory and commercial plant tests employing organic acid decobalting.

EXAMPLE I

Formation of aqueous solutions of cobalt anion in semi-commercial acetic acid decobalting system.

| Example | (1) | (2) | (3) | (4) |
|---|---|---|---|---|
| Oxo Stage Operations: | | | | |
| Feed Rate, B./D | 269 | 250 | 262 | 317 |
| Catalyst, Wt. percent Cobalt on Olefin | 0.24 | 0.32 | 0.28 | 0.24 |
| Olefin Conversion, Mol. percent | 71 | 70 | 67 | 66 |
| Oxo Oven Temperature, ° F. Avg | 339 | 333 | 328 | 330 |
| Acid Decobalting Operation: | | | | |
| Temperature, ° F | 180 | 175 | 180 | 180 |
| Water, Vol. percent on Olefin | 5.0 | 7.1 | [1] 4.9 | [1] 4.9 |
| Acetic Acid, Vol. percent on Olefin | 0.8 | 0.35 | 0.29 | 0.24 |

Degassing—Very slight—No inert stripping medium employed.

| Example | (1) | (2) (Fresh) | (2) (3 Days Storage) | (3) | (4) |
|---|---|---|---|---|---|
| Composition of water from acid decobalting operation: | | | | | |
| Specific Gravity (78° F.) | 1.058 | 1.060 | 1.065 | 1.172 | 1.202 |
| Total Acidity, Wt. percent as HAc | 2.89 | 1.20 | 1.14 | 0.63 | 0.34 |
| Cobalt as Co++, Wt. percent | 1.62 | 1.86 | 1.96 | 6.17 | 6.90 |
| Total Cobalt, Wt. percent | 2.42 | 3.09 | 3.06 | 8.98 | 9.90 |
| Cobalt as Anion, Wt. percent | 0.80 | 1.23 | 1.14 | 2.81 | 3.00 |
| Percent of Total Cobalt Present as Anion | 33 | 40 | 36 | 31 | 30 |

[1] In Examples 3 and 4 of the above table, although 5 vol. percent aqueous acid solution was specified, considerable difficulties with the acid pump resulted in actual injection estimated at less than 2 vol. percent aqueous acid based on aldehyde. The concentration effect resulting in dissolved cobalt greatly in excess of the solubility of cobalt acetate is illustrated.

EXAMPLE II

*Use of aqueous solutions containing cobalt anion as Oxo catalysts*

| | |
|---|---|
| Feed | Heptenes from $C_3$–$C_4$ copolymer. |
| Liquid feed rate | 0.3 v./v./hr. |
| Temperature | 350° F. |
| Pressure | 3000 p. s. i. g. |
| Catalyst concentration | 0.12–0.15 wt. percent Co (on olefin). |
| Catalyst solution [1] | About 3% (vol.) on olefin. |

| Hours: | Olefin conversion, mol percent |
|---|---|
| 31–36 | 74 |
| 37–42 | 75 |
| 43–48 | 72 |
| 49–54 | 74 |
| 55–60 | 75 |

[1] Catalyst solution same as Example 2 (fresh) above.

With cobalt oleate as catalyst under similar conditions olefin conversions averaged 73%.

EXAMPLE III

In the following table are shown the results of a series of batch tests illustrating the effect of carbon monoxide and hydrogen partial pressure on acid decobalting, and the necessity of maintaining a positive pressure of these gases during acid decobalting.

TABLE

| Run No. | 4258 | 4251 | 4256 |
|---|---|---|---|
| Synthesis | \multicolumn{3}{c}{500 cc. of C₇ olefin containing 0.2 wt. percent cobalt as cobalt oleate treated with CO and H₂ at 2,000–2,900 p. s. i. g. and 300–325° F. until gas absorption was complete. Operation carried out in shaker autoclave.} | | |
| Purge Conditions Method | \multicolumn{3}{c}{Autoclave pressured to about 2,000 p. s. i. g. with purge medium, shaken five minutes, then depressured.} | | |
| Number of Purges | 3 | 3 | None |
| Purge Temp., ° F | 125 | 90 |  |
| Medium | Nitrogen | Nitrogen |  |
| Decobalting | \multicolumn{3}{c}{Products shaken in autoclave with 10% (on olefin feed) of 5% acetic acid at 170° F. for 2 hours. Discharged, aldehyde and aqueous layers separated and analyzed.} | | |
| Pressure, p. s. i. g. During Decobalting | 100 | 175 | 100 |
| Aldehyde Product, Cobalt, wt. percent | 0.0021 | 0.0054 | 0.025 |
| After Hot Water Wash, Cobalt, wt. percent |  |  | 0.0008 |
| Aqueous Layer: |  |  |  |
| Cation Cobalt, wt. percent | 1.34 | 1.03 | 0.78 |
| Anion Cobalt, wt. percent | 0.0 | 0.49 | 0.52 |
| Percent of Cobalt in Water in Anion Form | 0 | 32 | 40 |

In run 4258, the product was degassed by three successive nitrogen purges at 125° F. and the system pressure of 100 p. s. i. g. under decobalting conditions is considered to represent essentially no hydrogen or carbon monoxide partial pressure. The aqueous layer from this decobalting operation contained no detectable anionic cobalt. This is directly comparable to run 4256 in which no purging was employed and the decobalting pressure of 100 p. s. i. g. was almost entirely carbon monoxide and hydrogen pressure. In this case 40% of the cobalt in the aqueous phase was present as the anion. The conditions of run 4251 are intermediate, being representative of incomplete degassing at a purging temperature of about 90° F.

EXAMPLE IV

This example illustrates the unusual and unexpected thermal stability of solutions containing the anion $Co(CO)_4^-$ and the practical application according to which relatively dilute solutions may be concentrated under similar conditions, cobalt carbonyl decomposes substantially completely. An aqueous solution similar to the above described solutions and obtained from semi-commercial decobalting of iso-octyl aldehyde with aqueous acetic acid, showed the following composition:

| | |
|---|---|
| Specific gravity 78° F | 1.0736 |
| Total acid, wt. per cent as acetic | 0.79 |
| Cobalt, wt. per cent as $Co^{++}$ | 2.39 |
| Cobalt, wt. per cent as $Co(CO)_4^-$ | 1.52 |

A volume of 315 cc. of this solution was concentrated by distilling off water at atmospheric pressure until the residue amounted to 218 cc. This represents a volume decrease of 30.8%. The residual solution was analyzed and had the following composition:

| | |
|---|---|
| Specific gravity 78° F | 1.108 |
| Total acid, wt. per cent as acetic | 0.64 |
| Cobalt, wt. per cent as $Co^{++}$ | 3.12 |
| Cobalt, wt. per cent as $Co(CO)_4^-$ | 2.00 |
| Cobalt accounted for, per cent of original charge | .94 |

These data show the cobalt constituents increased in concentration in proportion to the decrease in volume of the solution, there being little or no loss in cobalt in the form of the hydrocarbonyl anion. Also, the 30.8 vol. per cent decrease during concentration was entirely arbitrary, such that concentration to at least 10% cobalt could readily have been achieved.

What is claimed is:

1. In a carbonylation process wherein an olefin is reacted with CO, H₂ and a cobalt carbonylation catalyst at elevated temperatures and superatmospheric pressures in a carbonylation zone to form reaction products comprising aldehydes containing at least one more carbon atom than the olefin, and wherein a solution comprising said reaction products and dissolved cobalt catalyst is transferred to a catalyst removal zone and said catalyst is removed from said aldehyde product, the improvement of recovering said cobalt from said aldehyde product which comprises contacting said aldehyde product containing the dissolved cobalt catalyst with an admixed aqueous solution of an organic acid selected from the group consisting of formic and acetic acids which forms a cobalt compound that is at least moderately water-soluble, 5 to 15 volume per cent of the aqueous organic acid solution being thus admixed based on the aldehyde product, maintaining the resulting mixture of the aldehyde product and aqueous organic acid at a temperature in the range of 150° to 200° F. and under a carbon monoxide-containing synthesis gas pressure of 10 to 150 pounds per square inch gage in said catalyst removal zone to convert the cobalt catalyst dissolved in the aldehyde product into water-soluble forms of cobalt, recovering from said catalyst removal zone a substantially cobalt-free aldehyde product, and recovering from said catalyst removal zone an aqueous solution of the cobalt in water-soluble anionic and cationic forms.

2. The process of claim 1, wherein the organic acid is acetic acid and wherein the aqueous cobalt solution recovered from the catalyst removal zone is passed to the carbonylation zone to supply at least a portion of the catalytic requirements therein.

3. The process of claim 1 wherein the pressure of the carbon monoxide-comprising synthesis gas in the catalyst removal zone is at about 50 to 100 p. s. i. g.

4. The process in accordance with claim 1 in which the aqueous solution containing the water-soluble cobalt forms recovered from the catalyst removal zone contains $Co(Co(CO)_4)_2$ and said solution is concentrated by distilling water therefrom prior to recycling said solution to said carbonylation zone.

References Cited in the file of this patent

UNITED STATES PATENTS

| | | |
|---|---|---|
| 2,544,271 | Liedholm et al. | Mar. 6, 1951 |
| 2,564,104 | Gresham et al. | Aug. 14, 1951 |

OTHER REFERENCES

I. G. Farbenindustrie, Pat. Application O. Z. 13,705, T. O. M. Reel 36 (available in English Translation in "Oxo Process," Chas. A. Meyer Translation PC–S–V, pp. 62–63). Deposited in Library of Congress, Mar. 12, 1946.

Wender et al.: J. Amer. Chem. Soc., vol. 72, pp. 4375–4378, October 1950.